United States Patent
Lund

(10) Patent No.: US 6,474,053 B1
(45) Date of Patent: Nov. 5, 2002

(54) LAWNMOWER EQUIPPED WITH A RETRACTABLE EDGER AND TRIMMER

(76) Inventor: David M. Lund, 14477 Barnes Dr., Detroit Lakes, MN (US) 56501

( * ) Notice: Subject to any disclaimer, the term of this patent is extended or adjusted under 35 U.S.C. 154(b) by 0 days.

(21) Appl. No.: 09/628,497

(22) Filed: Jul. 28, 2000

(51) Int. Cl.[7] .................. A01D 34/03; A01D 34/44; A01D 34/66
(52) U.S. Cl. ........................ 56/13.7; 56/12.7
(58) Field of Search .................. 56/13.7, DIG. 9, 56/12.7, 16.9, 13.6, 11.6

(56) References Cited

U.S. PATENT DOCUMENTS

| | | | |
|---|---|---|---|
| 2,771,730 A | * 11/1956 | True | 56/11.6 |
| 3,782,085 A | * 1/1974 | Parker et al. | 56/11.6 |
| 4,170,099 A | 10/1979 | Owens | 56/16 |
| 4,453,372 A | * 6/1984 | Remer | 56/13.7 |
| 4,587,800 A | 5/1986 | Jimenez | 56/16 |
| 4,642,976 A | 2/1987 | Owens | 56/16 |
| 4,718,221 A | 1/1988 | Wessel et al. | 56/16 |
| D304,728 S | 11/1989 | Piorkowski | D15/16 |
| 4,896,488 A | 1/1990 | Duncan et al. | 56/13 |
| 4,949,536 A | * 8/1990 | Neufeld | 56/13.7 |
| D311,009 S | * 10/1990 | Wilkins | D15/17 |
| 5,035,107 A | * 7/1991 | Scarborough | 56/10.4 |
| 5,040,360 A | 8/1991 | Meehleder | 56/11 |
| 5,048,276 A | 9/1991 | Miller | 56/16 |
| 5,159,803 A | 11/1992 | Earley, Jr. | 56/12 |
| 5,167,108 A | 12/1992 | Bird | 56/13 |
| 5,226,284 A | 7/1993 | Meehleder | 56/11 |
| 5,560,189 A | 10/1996 | Devillier et al. | 56/13 |
| 5,857,315 A | 1/1999 | Keane | 56/16 |
| 5,862,655 A | * 1/1999 | Altamirano et al. | 56/12.1 |
| 6,094,896 A | * 8/2000 | Lane | 56/13.7 |
| 6,256,970 B1 | * 7/2001 | Fleener | 56/12.7 |

* cited by examiner

Primary Examiner—Robert E. Pezzuto
Assistant Examiner—Árpád Fábián Kovács
(74) Attorney, Agent, or Firm—Curtis Harr

(57) ABSTRACT

A lawnmower has attached to the forward portion of its mowing deck a pivotally mounted extending flailing mechanism. The flailing mechanism is an arm that is pivotally mounted to one front corner of the mower deck at its most rearward end and extends from that point either across the front of the mower in its retracted position or out in front of the mower in its extended position. The flailing mechanism has a flailing head positioned on the under side of the arm and located at the arm's most outward end in relation to the pivotal connection on the mower. Further the flailing head is rotationally mounted to the arm such that it may be rotated from a substantially horizontal cutting plane towards a vertical.

17 Claims, 7 Drawing Sheets

FIG 14
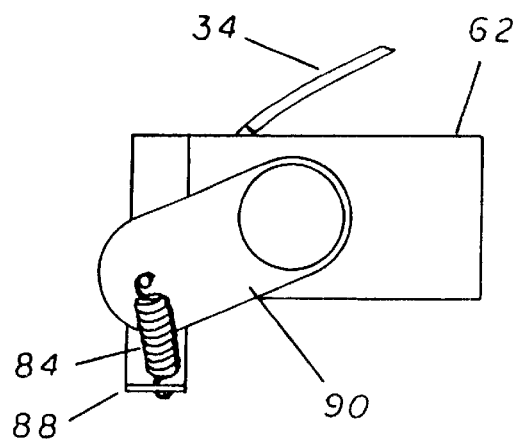
FIG 15
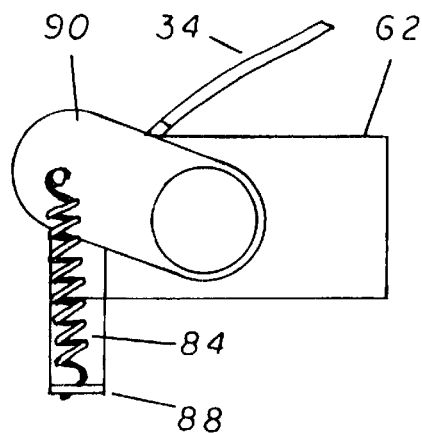
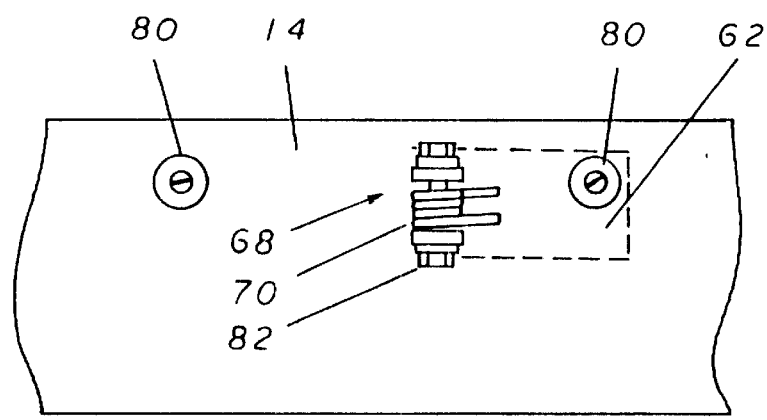
FIG 16

LAWNMOWER EQUIPPED WITH A RETRACTABLE EDGER AND TRIMMER

BACKGROUND OF THE INVENTION

The present invention relates to the field of lawn mowing and trimming equipment. More specifically to a walk behind type lawn mower supplied with a retractable string type trimmer.

Many property owners today currently own both a walk behind lawn mower and a string type trimmer. Generally, the job of mowing and trimming an intricately landscaped lawn is done in two steps. The first step typically involves mowing the vast majority of the area and getting as close to landscaping such as trees, gardens, shrubs, houses and the like as can be done with an ordinary walk behind lawn mower. Upon completion of this job, the second step is carried out using a string type trimmer. The aforementioned obstacles are trimmed using the weed trimmer to cut any excess grass that may remain around the edges. A further step commonly carried out is that of edging along sidewalks where grass and sod may begin to creep onto the pavement or cement. This can be done with a specialized edger or a weed eater held at an angle to cut this section of the sod and create a clean edge along sidewalks, concrete and the like.

Many attempts have been made at combining these jobs and devices so that the task may be accelerated and the cost of equipment brought to a minimum. One such device is disclosed is the Miller U.S. Pat. No. 5,048,276. This device discloses a walk behind type lawn mower supplied with a string type trimmer assembly about the side of the mower. One problem with this type of device is that the trimming apparatus is always present on the side of the mower and can interfere when trying to mow close to obstacles where trimming is not desired. Further, this device may not be easily engaged and disengaged for normal mowing. Attempts have been made to provide such a device that may be easily engaged and disengaged. One such device is further shown in the Owens U.S. Pat. No. 4,170,099. This patent once again discloses a walk behind type mower supplied with a trimming assembly mounted to the side of the mower. This assembly may be lifted upward or rotated downward into an engaged position. This device is rather complicated as it is mounted to the side of the mower and requires that the user specifically push the mower in a line in order to trim along the edge of obstacles, often requiring a second trip after the mowing is completed. Finally, devices such as the Devillier et al. U.S. Pat. No. 5,560,189 disclose a walk behind type lawn mower having a vertical edger apparatus and a horizontal trimming apparatus. Although it may be desirable to have both of these apparatus's, the assembly becomes rather complicated and further is once again not easily retractable in order to allow for unhindered mowing when trimming and edging.

From this discussion it can be seen that it would be desirable to provide a mechanism for a walk behind type lawnmower that is not only easily retractable and may be moved out of the way for normal mowing but may also be placed in such an orientation that as a normal mower cut is made along the edge of a building or obstacle, trimming may be done at the same time as mowing, thus not requiring the mower to be pushed in an inefficient second trip around the obstacle for trimming.

SUMMARY OF THE INVENTION

It is the primary objective of the present invention to supply a lawnmower apparatus which will provide an individual with the ability to not only mow a section of grassy lawn, but will simultaneously allow the user to trim along edges of the lawn that the mower normally is unable to reach and leaves uncut in the same mower pass as that portion of the lawn that is directly adjacent to the uncut edge.

It is an additional objective of the present invention to provide such a means of simultaneously mowing and trimming a lawn in which a flailing mechanism is pivotally attached to the deck of a common gasoline powered lawnmower, either a push type or riding mower, in such a manner that the flailing head can be extended when it is required for trimming purposes and retracted when it is not.

It is a further objective of the present invention to provide such a means of simultaneously mowing and trimming a lawn in which the flailing head is rotationally driven by means of a pair of common V-belts that extend forward from a pulley located on the external portion of the engine drive shaft and in which such rotational force is supplied by the mower engine through said pulley.

It is a still further objective of the present invention to provide such a means of simultaneously mowing and trimming a lawn that is safe for the operator to use as the flailing head is only actively driven by the V-belt when the flailing mechanism is fully extended out in front of the mower deck by the operator and so the flailing head can never be engaged unless the operator has made a conscious decision to do so.

It is a still further objective of the present invention to provide a flailing mechanism that is rotatable during use so that it may be used in the horizontal position for trimming and rotated at an angle toward the vertical for edging or close trimming, all with little effort supplied by the operator.

These objectives are accomplished by the use of a common gasoline power lawnmower, either a push mower or a riding mower, which has attached to the forward portion of its mowing deck a pivotally mounted extending flailing mechanism. The flailing mechanism is essentially an arm that is pivotally mounted to one front corner of the mower deck at its most rearward end and extends from that point either across the front of the mower in its retracted position or out in front of the mower in its extended position. This positioning of the flailing mechanism is typically controlled by a series of control levers that are most commonly mounted on the handle of the mower and which can be easily manipulated during the normal operation of the mower.

The flailing mechanism has a flailing head positioned on the under side of the arm and located at the arm's most outward end in relation to the pivotal connection on the mower. The flailing head is a relatively small cylindrical object that contains a plurality of extending flailing lines. Additionally, the flailing head is connected through a pulley located on its upper most surface to a pulley on the engine of the lawn mower through a series of V-belts. These V-belts provide the rotational force necessary to spin the flailing head at a high speed which also spins the flailing lines which in turn provide the cutting force to trim the desired areas.

Therefore, when the operator is mowing a section of lawn that boarders an obstacle such as a building, rock, or other immovable object which the mower cannot approach closely enough so as to cut the grass that is on the very edge of the lawn, he can simply extend the flailing arm and employ the spinning flailing head and line to cut this grass. Additionally, the design of the present invention ensures that the V-belts are only engaged when the flailing arm is extended and that the flailing arm can only be extended by an intended or positive action of the operator. This greatly enhances the safety characteristics of the invention as it ensures that the flailing head and line are never in motion unless such motion is an intended result of the operator of the lawnmower.

Finally, the flailing head is connected so as to be rotatable from a relatively horizontal cutting position towards a more vertical cutting position for edging and the like. The rotation of the flailing head is controlled by one of the control levers mounted on the handle of the mower and thus, the operator may easily manipulate the head during normal operation to rotate the head so the flailing is more vertical for edging or for closer trimming.

For a better understanding of the present invention reference should be made to the drawings and the description in which there are illustrated and described preferred embodiments of the present invention.

DESCRIPTION OF THE DRAWINGS

FIG. 14 is a front elevation view of the body block and rotator arm components of the present invention and illustrates their relative positions when the trimmer head has not been rotated to change the orientation of the trim line.

FIG. 15 is a front elevation view of the body block and rotator arm components of the present invention and illustrates their relative positions when the trimmer head has been rotated to change the orientation of the trim line.

FIG. 16 is a front elevation view of the arm mount component of the present invention and illustrates the manner in which the forward arm is connected to the mower body.

DESCRIPTION OF THE PREFERRED EMBODIMENT

Figure 1:
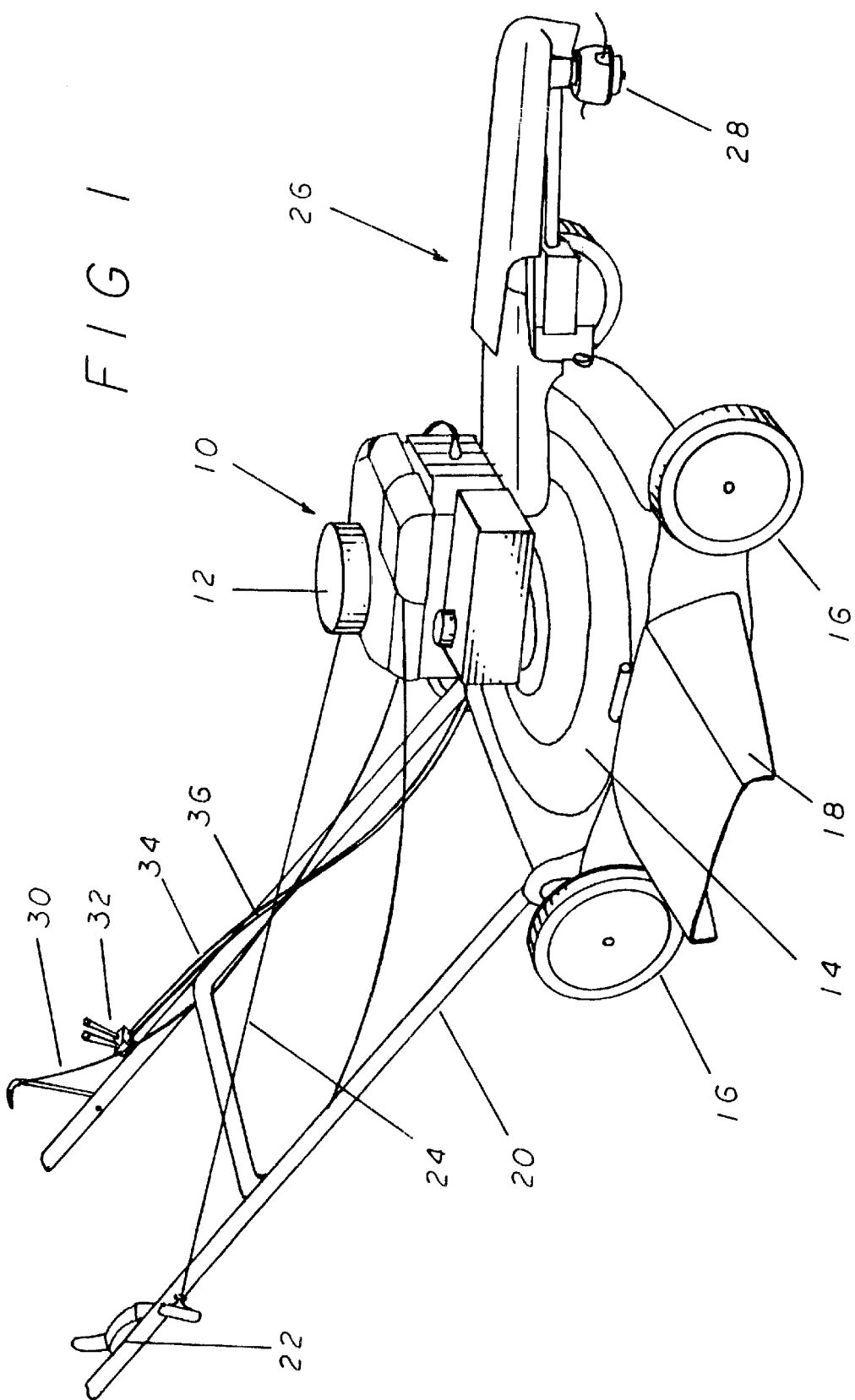
FIG. 1 is a perspective view of the present invention which illustrates a typical powered push-type lawnmower which has attached to it's forward end a pivotally mounted trimmer mechanism which may be extended forward when the operator desires to trim the edges of the lawn being cut.
Figure 2:
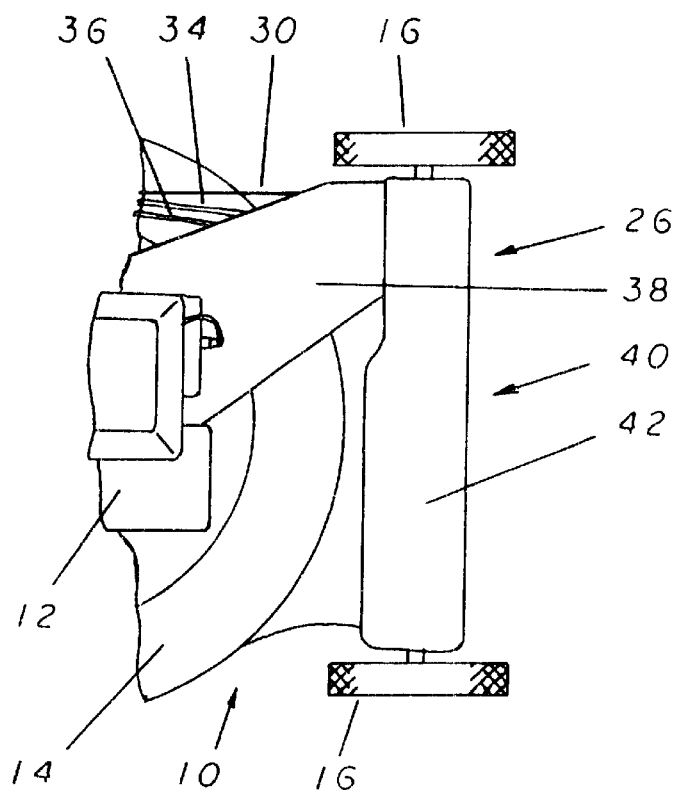
FIG. 2 is a top elevation view of the present invention illustrating the position of the trimmer assembly when it is in the retracted position.
Figure 3:
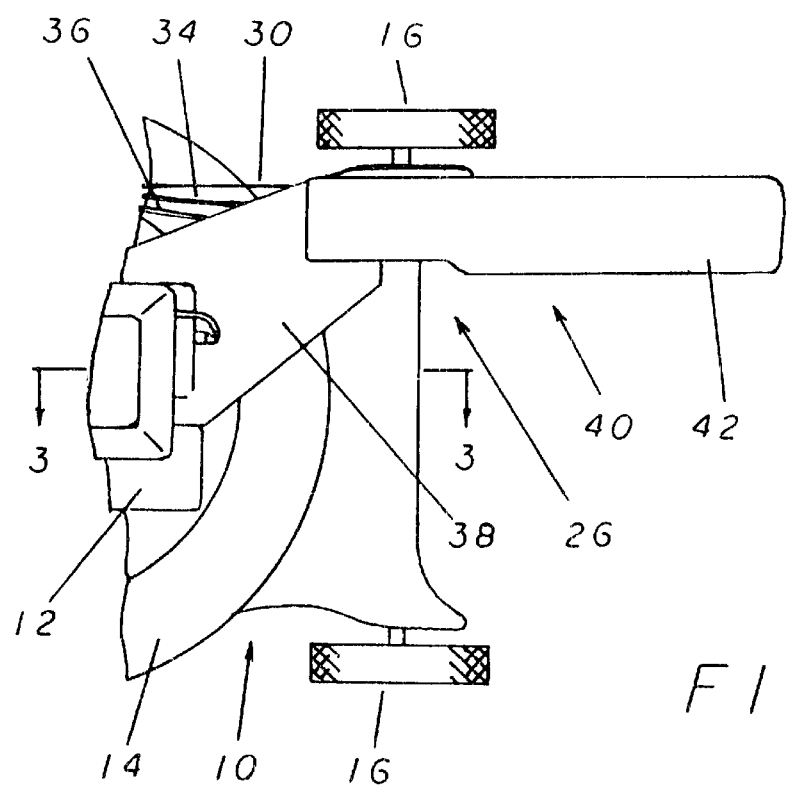
FIG. 3 is a top elevation view of the present invention illustrating the position of the trimmer assembly when it is in the extended position.

Referring now to the drawings, and more specifically to FIGS. 1, 2, and 3, the present invention is made by making use of a typical gasoline engine driven push-type lawnmower 10. The lawnmower 10 utilized in the present invention is typical in its manner of construction and the orientation of its primary components. That is to say, that the lawnmower 10 is configured with a gasoline mower engine 12 which is located at, or near, the center of the upper surface of a mower deck 14 which is generally square in shape and which has four mower wheels 16, one each of which are positioned at each corner of the mower deck 14. Additionally, the mower deck 14 is also equipped with a mower discharge chute 18 which is located along one of its side edges and the mower discharge chute 18 can be opened during lawn mower 10 operation to direct the cut grass clippings to one side of the mower deck 14. It should further be stated at this point that a riding type mower (not shown) may also be utilized for the current invention.

The rearward edge of the mower deck 14 provides the point of attachment for the mower handle 20. The mower handle 20 is the component of the lawnmower 10 which allows the operator to control not only the direction and speed of the lawnmower 10, but also provides the point of attachment for the plurality of controls that are necessary to operate the lawnmower 10 and the trimmer 26. The controls that are employed to operate the lawnmower include the engine throttle control 22 and the start cable 24, the functions and operations of which are self evident. Additionally, the mower handle 20 can also contain control devices that are specific to the operation of the lawnmower 10, such as a drive engage and engine shut off bar, which are omitted in this discussion for the purpose of illustrative simplicity.

The controls contained on the mower handle 20 also include a number which are specific to the operation of the present invention. These include the trimmer controls 32 and the trimmer position cable 30. The trimmer control 32 is most commonly made up of two handles, one of which controls the orientation of the trimmer head 28 through the head orientation control cable 34 and the other which controls the feeding of the flailing line through the flailing line feed cable 36, both of which will be discussed in greater detail below. The trimmer position cable 30 controls the orientation of the trimmer 26 in relation to the mower deck 14 which is illustrated further in FIGS. 2 and 3. When the position cable is not retracted or disengaged, the front arm 40 of the trimmer 26 in its normal position spans the front of the mower deck 14 in a parallel orientation. Alternatively, when the trimmer position cable 30 is retracted or engaged, the front arm 40 of the trimmer 26 extends outward from the edge of the mower deck 14 in a perpendicular manner. Therefore, the positioning of the trimmer 26 and the front arm 40 is under the complete control of the operator through the trimmer controls 32 located on the mower handle 20. This design feature greatly enhances the overall safety of the invention in regards to the operator and any other bystanders that are in close proximity to the invention during its operation.

The design of the present invention also incorporates additional safety features that protect the user or other bystanders from the moving parts of the present invention. These safety features consist of the rear belt cover 38 and the front belt cover 42. The rear belt cover 38 covers that portion of the invention that spans the area between the front of the mower deck 14 and the mower engine 12 and keeps outside items from coming into contact with the moving components of the invention in this area. The front belt cover 42 covers the top of the front arm 40 of the trimmer 26 and functions much the same as the rear belt cover 38. Additionally, both the rear and front belt covers, 38 and 42, also protect the moving parts of the invention from damage due to contact with foreign objects such as rocks, sticks, and other debris kicked up by the lawn mower 10.

Figure 4:
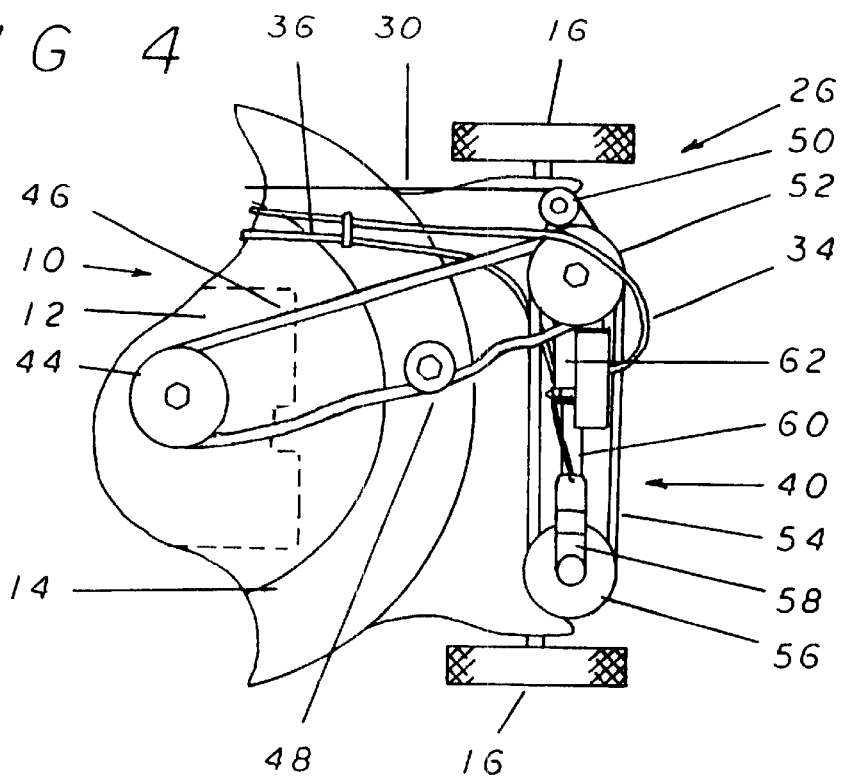
FIG. 4 is a top elevation view of the present invention with the trimmer arm in the retracted position and in which the arm covers of the trimmer mechanism have been removed to reveal the inner workings of the invention.
Figure 5:
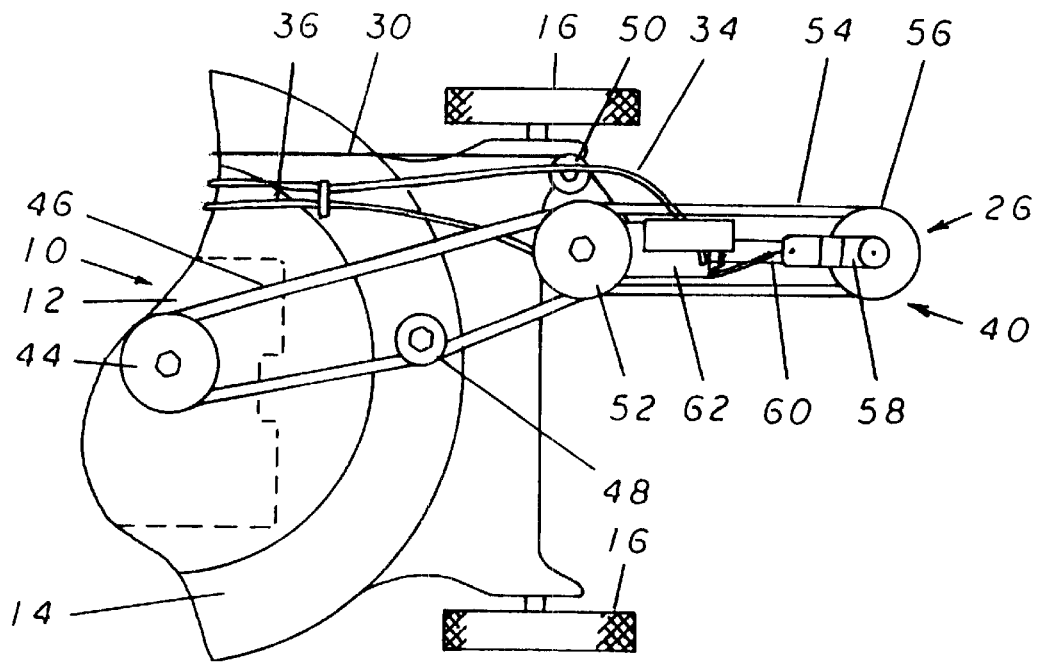
FIG. 5 is a top elevation view of the present invention with the trimmer arm in the extended position and in which the arm covers of the trimmer mechanism have been removed to reveal the inner workings of the invention.
Figure 6:
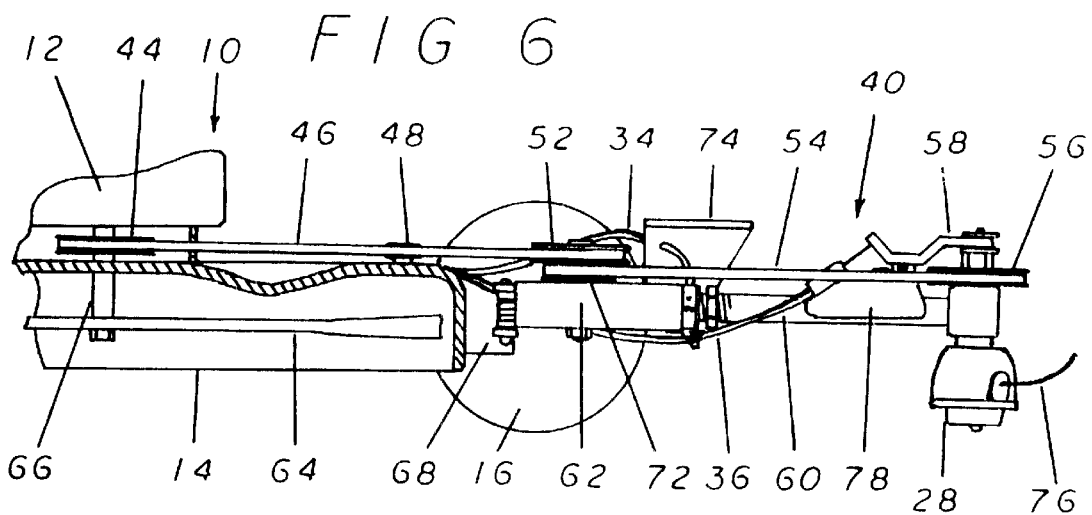
FIG. 6 is a side elevation cross-sectional view of the of the present invention showing the interior of the mower deck and the drive mechanism employed to power the trimmer and taken along line 3—3 of FIG. 3.
Figure 7:
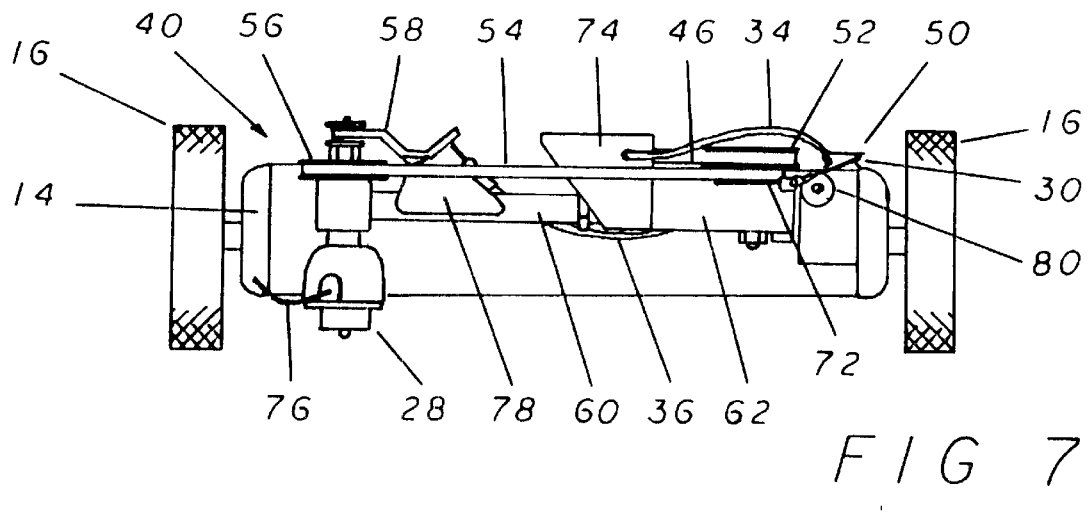
FIG. 7 is a front elevation view of the present invention with the trimmer arm in the retracted position and in which the arm covers of the trimmer mechanism have been removed to reveal the inner workings of the invention.
Figure 8:
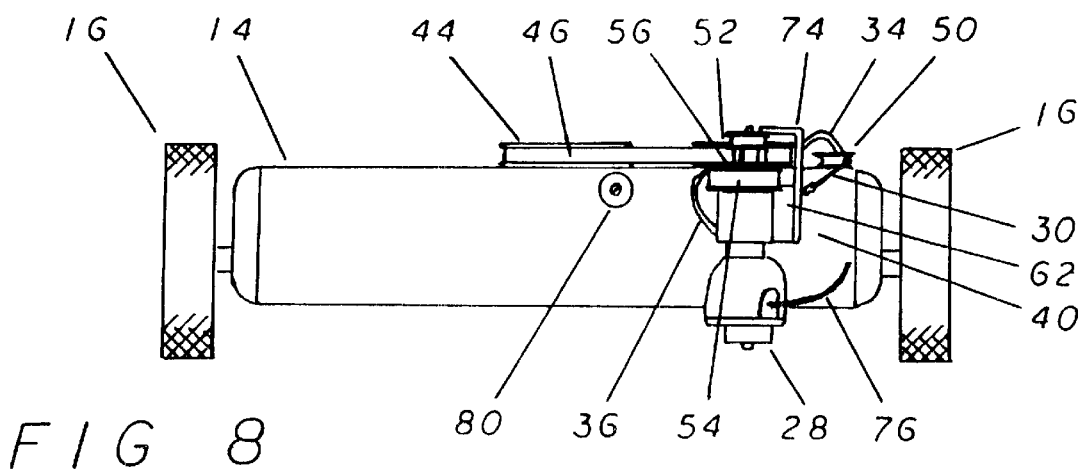
FIG. 8 is a front elevation view of the present invention with the trimmer arm in the extended position and in which the arm covers of the trimmer mechanism have been removed to reveal the inner workings of the invention.
Figure 9:
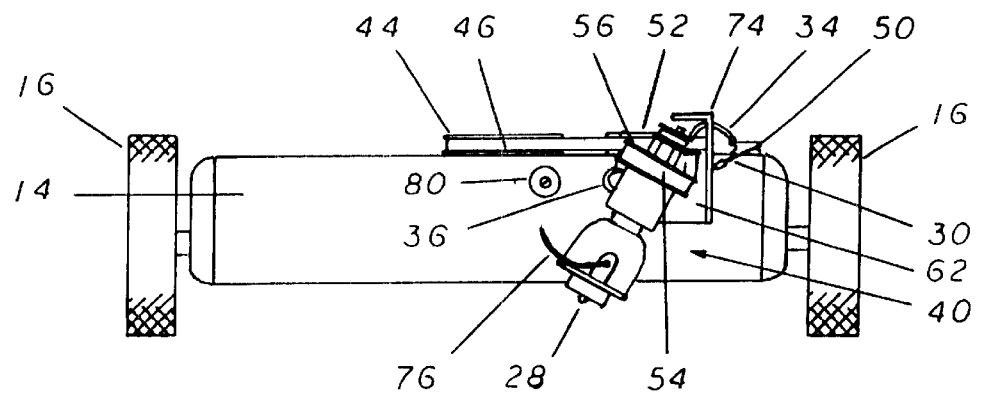
FIG. 9 is a front elevation view of the present invention with the trimmer arm in the extended position and in which the arm covers of the trimmer mechanism have been removed to reveal the inner workings of the invention and in which the trimmer head is in its rotated position.

The manner of construction of the trimmer head 28 drive mechanism is further detailed in FIGS. 4, 5, and 6. The rotational force that is necessary to power the trimmer head 28 of the present invention is primarily provided by the mower engine 12 through the rear belt 46 and the front drive belt 54. The mower engine 12 has attached to its primary engine shaft 66 at the point that is just above the upper surface of the mower deck 14 and above the mower blade 64, a rear belt drive pulley 44 which transfers the rotational force of the mower engine 12 to the rear belt 46. The rear belt 46 extends forward from the rear belt drive pulley 44 to the rear belt front pulley 52 which is mounted to the most rearward portion of the front arm 40 of the trimmer 26. Additionally, one side of the rear belt 46 passes around the rear belt idler pulley 48 which is positioned on the mower deck 14 about halfway between the rear belt drive pulley 44 and the rear belt front pulley 52. The purpose of the rear belt idler pulley 48 is to ensure that the rear belt 46 remains in the proper orientation relative to the rear belt drive pulley 44 and the rear belt front pulley 52 when the present invention is in use.

The rear belt front pulley 52 is mounted to the front arm body block 62 of the front arm 40 and is constructed in such a way as to have the front belt rear pulley 72 situated between it and the upper surface of the front arm body block 62. The rear belt front pulley 52 and the front belt rear pulley 72 are fixedly attached to one another and are most commonly manufactured as a single unit. This attachment of the two pulleys means that any rotational force applied to the rear belt front pulley 52 through the rear belt 46 is transferred to the front belt rear pulley 72 and the front belt 54 which extends forward from the front belt rear pulley 72. Additionally, the front belt rear pulley 72 is smaller in diameter that the rear belt front pulley 52 which acts as a gear reduction system. This gear reduction mechanism has the effect of increasing the speed at which the front belt rear pulley spins which in turn speeds up the front belt 54 and, therefore, the rotational speed of the trimmer head 28. The increased speed of the flailing head 28, which is a direct result of the gear reduction, is significant to the purpose and design of the present invention as it allows the trimmer head 28 and flailing line 76 to operate more efficiently at standard mower engine 12 speeds than would be otherwise possible.

The front belt 54 extends forward along the length of the front arm 40 from the front belt rear pulley 72 to the front belt forward pulley 56 located at the most forward end of the invention. The front belt forward pulley 56 drives the trimmer head 28, which is mounted directly beneath it, by means of the rotational force provided by the belt system. Additionally, the trimmer head 28 is mounted at the most forward end of the forward arm tube 60 which in turn is mounted to the front of the front arm body block 62. Therefore, the front arm body block 62, the forward arm tube 60 and the trimmer head 28 together form the front arm 40 of the invention which is in turn pivotally mounted to the mower deck 14 at the rear surface of the front arm body block 62 through the use of the arm mount 68.

The positioning of the rear belt front pulley 52 on the rearward surface of the front arm body block 62 serves an additional purpose in relation to the operation of the rear belt and, therefore, the rotation of the trimmer head 28. In this, the rear belt front forward pulley 52 is positioned just forward of the pivotal arm mount 68 connecting the front arm 40 to the mower deck 14. This position of the rear belt front pulley 52 is significant to the invention because when the front arm 40 is folded back against the forward edge of the mower deck 14, the rear belt front pulley 52 is actually closer to the rear belt drive pulley 44 than when the front arm 40 is extended. This change of the relative position of the rear belt front pulley 52 has the effect of engaging and disengaging the rear belt 46. When the front arm 40 is retracted against the mower deck 14 (this is the natural position of the front arm 40 and it will always remain there without action by the operator), the rear belt is loose and consequently not rotationally driven by the rear belt drive pulley 44. Conversely, when the front arm 40 is extended out in front of the front arm 40, the rear belt 46 is pulled tight. This action engages the rear belt 46 to the rear belt drive pulley 44 which in turn drives the trimmer head 28 through the rear belt front pulley and the front belt 54. The engagement and disengagement mechanism ensures that the flailing head is only spinning when the operator intends it to be and takes positive and specific action towards that end which greatly increases the probabilities of safe operation of the present invention.

Figure 11:
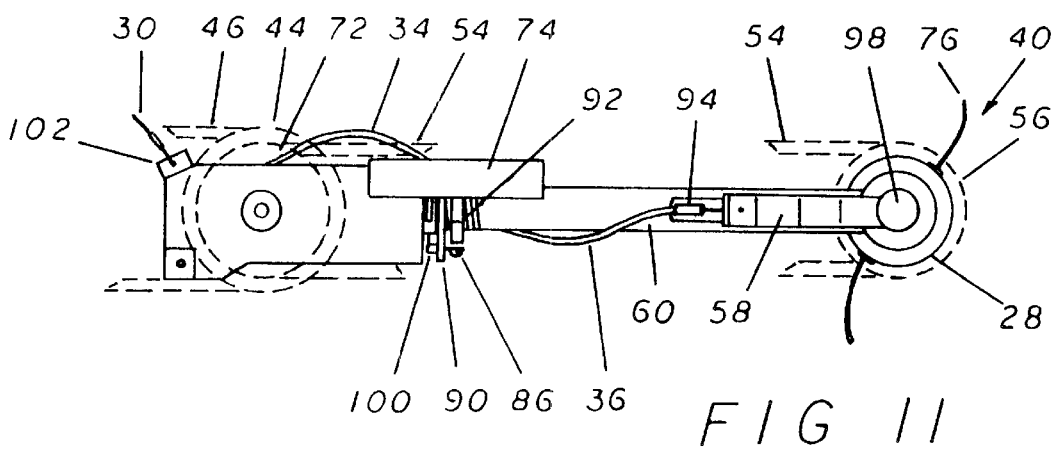
FIG. 11 is a top elevation view of the forward arm of the trimmer assembly component of the present invention and illustrates the orientation of the major components of the forward arm.
Figure 12:
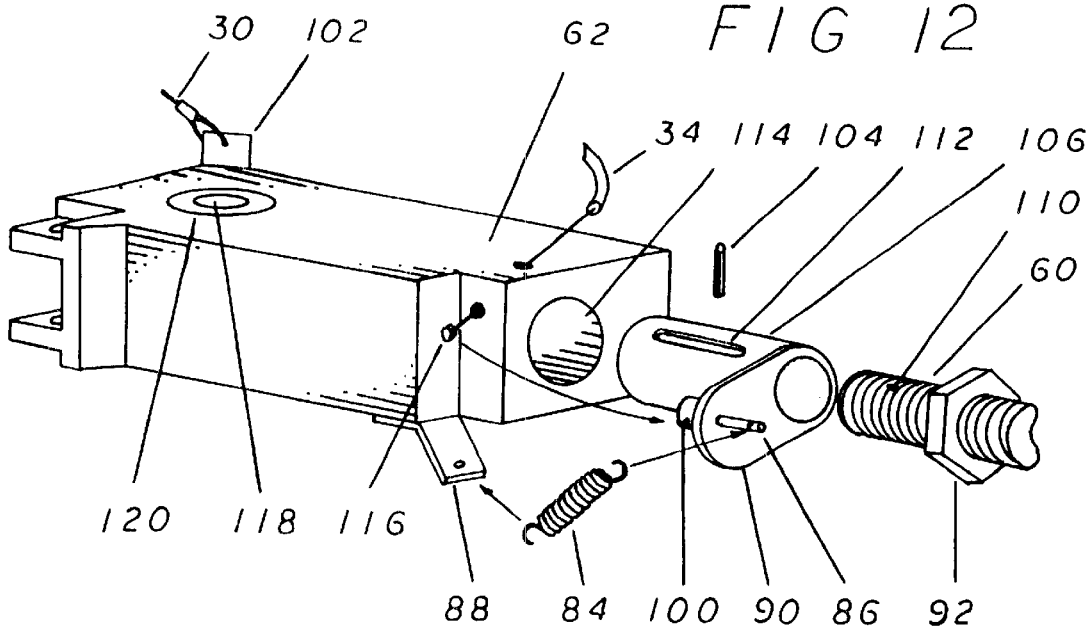
FIG. 12 is an exploded perspective view of the rear portion of the forward arm component of the present invention illustrating the manner in which is major components interact to form the basis of the invention.
Figure 13:
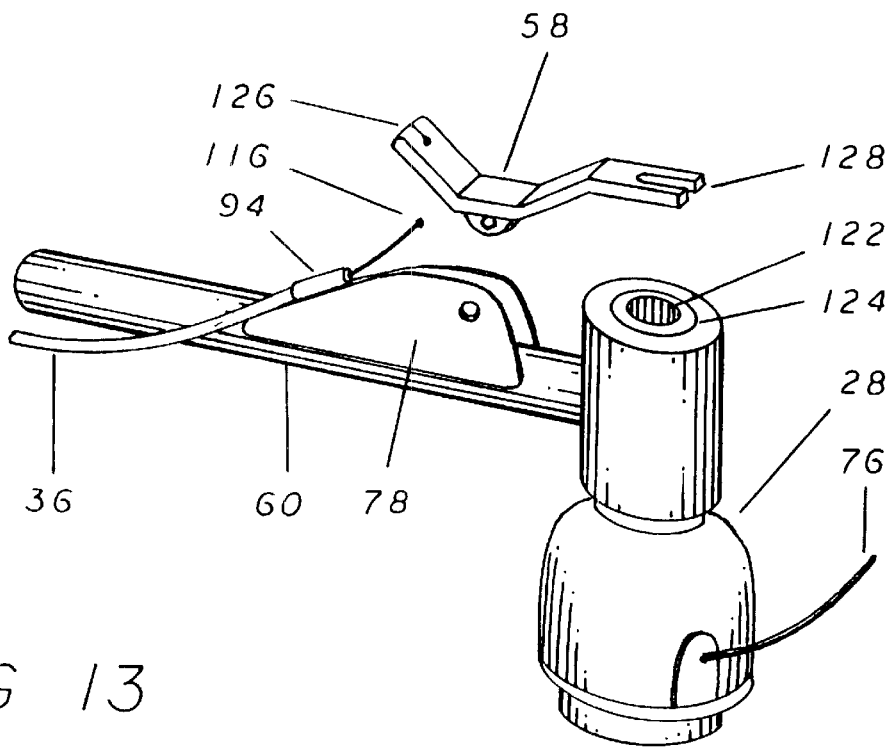
FIG. 13 is a an exploded perspective view of the forward portion of the forward arm component of the present invention illustrating the manner in which it's major components interact to form the basis of the invention.

The specific manner of construction of the front arm 40 and of its individual components are further illustrated in FIGS. 11, 12, and 13. The first major component of the front arm 40 is the front arm body block 62 which is the portion of the front arm 40 which connects to the mower deck 14. This connection is made by use of the arm mount 68 which is located at the inside rear corner (in relation to the body of the invention) of the front arm body block 62. This point of attachment on the rear corner allows for the front arm body block 62 to pivot in the manner which facilitates the variable positioning of the rear belt front pulley 52 as previously described and which is mounted to and rotates within the front arm body block 62 in the rear pulley hole 118 and the rear pulley bearing 120. Additionally, the positioning of the front arm body block 62, and therefore the entirety of the front arm 40, is controlled by the trimmer positioning cable 30 which is attached to the front arm body block 62 at the position cable bracket 102 which is located on the opposite rear corner of the front arm body block 62 in relation to the arm mount 68.

The forward end of the front arm body block 62 contains the point at which the forward arm tube 60 is positioned and extends forward from. This is accomplished by having the sleeve hole 114 bored into the forward face of the front arm body block 62. The sleeve hole 114 is a relatively shallow hole which is designed to accept and loosely hold the rotator sleeve 106. The rotator sleeve is itself hollow and in turn designed to accept and loosely hold the rearward end of the forward arm tube 60. The depth at which the forward arm tube 60 extends into the rotator sleeve 106 is controlled by the tensioning nut 92 which threads over and which can be variably positioned along the rearward end of the forward arm tube 60. The important aspect of the connection of the forward arm tube 60 to the front arm body block 62 is that there is no active mechanical means of holding the two together at the junction. Instead, the necessary force is provided by the front belt 54 which spans the connection area along with the action of the tensioning nut 92. This occurs because if the tensioning nut 92 is backed off and the forward arm tube 60 is allowed to pass further into the rotator sleeve 106, the distance between the front belt rear pulley 72 and the front belt forward pulley 56 will shorten and the front belt running around the pulleys, 72 and 54, will loosen as the entire front arm 40 shortens. If one takes this action to its extreme, the front belt 54 will become so loose that it can be fully removed which will allow the entire front arm 40 apparatus to be pulled clear from the front arm body block 62.

Conversely, if the tensioning nut 92 is tightened, the forward arm tube 60 will be forced in an outward manner which will increase the distance between the front belt rear pulley 72 and the front belt forward pulley 56 and tighten the front belt 54. It is the tension placed on the front belt 54 by the action of the tensioning nut 92 that works to hold the forward arm tube 60 within the front arm body block 62 while providing a mechanism by which the front arm 40 can be easily taken apart for repair and service.

From the forward surface of the front arm body block 62, the forward arm tube 60 extends forward until it terminates at its point of attachment to the trimmer head 28. The forward arm tube 60 also provides the point of attachment for the feed lever bracket 78 to which the flailing line feed lever 58 is mounted. Additionally, the upper surface of the trimmer head 28 provides the point of attachment for the front belt forward pulley 56 through the front pulley hole 122 and the front pulley bearing assembly 124. The front pulley bearing assembly 124 also transfers the rotational force from the front belt 54 and its front belt forward pulley 56 to the trimmer head 28 and flailing line 76.

The extending and retracting operations of the front arm 40 component of the present invention are further illustrated in FIGS. 4, 5, 6, 7, 8, 10, and 16. As stated above, the front arm 40 is extended by the operator through the use of the trimmer position cable 30. The trimmer position cable 30 passes from the mower handle 20 to run along the upper surface of the mower deck 14 to a point just above the arm mount 68 where the front arm 40 is mounted to the mower deck 14. At this point, the trimmer position cable 30 passes around the positioning cable pulley 50 which functions to retain the trimmer position cable 30 in the proper position in relation to the front arm 40. From the positioning cable pulley 50, the trimmer position cable 30 drops down to the point where it is connected to the rear corner of the front arm body block 62 that is opposite of the arm mount 68 of the front arm 40 through the position cable bracket 102.

The trimmer position cable 30 and position cable bracket 102 work in conjunction with the components of the arm mount 68 to allow the operator of the invention to control the position of the front arm 40, and therefore, the position of the trimmer head 28. The natural tendency of the front arm 40 is to remain in the retracted position along the front edge of the mower deck 14. This is because the arm mount 68 contains a mount spring 70 that fits over the mount bolt 82 which holds the front arm body block 62 in place on the mower deck 14. The mount spring 70 places a closing force on the front arm 40 when it is in its extended position which must be overcome to extend the front arm 40. This is accomplished by the operator activating the trimmer position cable 30 which swings the front arm 40 outward until it is fully extended in front of the mower deck 14. This action engages the trimmer head 28 (as previously described) and positions it allowing the operator to trim the desired section of grass. The front arm 40 can be returned to its retracted position simply by releasing the trimmer position cable 30 which allows the mount spring to force the front arm body block 62 back against the front surface of the mower deck 14. Additionally, the position of the body block in both the retracted and extended orientations is controlled by the pair or rubber arm stops 80 against which the front arm body block 62 rests in either position.

The manner in which the trimmer head 28 is articulated from side to side and the mechanisms by which this is accomplished are further illustrated in FIGS. 8, 9, 10, 12, 14, and 15. The trimmer head 28 is mounted on the terminal end of the forward arm tube 60. The articulating ability of the trimmer head 28 is a function of the manner in which the forward arm tube 60 is connected to the front arm body block 62. As previously described, this connection is made by the use of the rotator sleeve 106. The important aspect of this connection is that the rotator sleeve 106 is not fixedly attached to the front arm body block 62 and is free to rotate within the sleeve hole 114. Additionally, the forward arm tube 60 is also not fixedly attached to the rotator sleeve 106 and is only restricted in movement by a pin 104 which, when properly in place, extends slightly out from the pin hole 110 of the forward arm tube 60. This protrusion of the pin 104 fits within the pin slot 112 in the rotator sleeve 106. This method of manufacture keeps the forward arm tube 60 and the rotator sleeve in the same rotational orientation as one another which is important to the articulation of the extended trimmer head 28.

The most rearward surface of the rotator sleeve 106 is equipped with a perpendicularly extending rotator arm 90 upon which are mounted the spring pin 86 and the cable retainer 100. The purpose of the rotator arm 90 is to provide a leverage surface upon which rotational force can be applied to rotate the rotator sleeve 106 and articulate the trimmer head 28. This rotational force is supplied through the cable retainer 100 to which is attached the head orientation control cable 34. The head orientation control cable 34 is attached on one end to the mower handle 20 and passes trough the block bracket 74 prior to its attachment at the front arm body block 62. Additionally, the rearward end of the control cable is equipped with a cable ball end 116 which fits within and attaches to the cable retainer 100. Thus, when the invention operator manipulates the head orientation control cable 34, the rotator arm 90 is pulled in an upward fashion which rotates the rotator sleeve 106 which in turn rotates the trimmer head 28.

This articulation system is enhanced by the use of the rotator spring 84 which functions to return the rotator arm 90 to its normal operating position (with the trimmer head 28 in the horizontal orientation) unless the head orientation control cable 34 is engaged. The rotator spring 84 performs this function by being attached at its upper end to the spring pin 86 on the rotator arm 90 and on its lower end to the spring bracket 88 which is located on the forward lower surface of the front arm body block 62. The rotator spring 84 spans the space between the front arm body block 62 and the pivotal rotator arm 90 and resists movement imparted to the rotator arm 90 through the head orientation control cable 34. This resistance is the force that keeps the trimmer head 28 in its normal position unless the lawn mower 10 operator intends it to be rotated.

Figure 10:
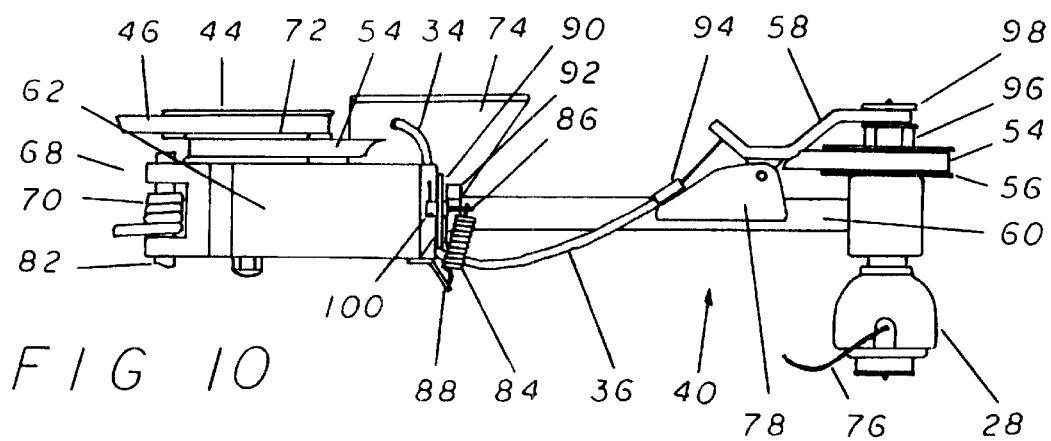
FIG. 10 is a side elevation view of the forward arm of the trimmer assembly component of the present invention and illustrates the orientation of the major components of the forward arm.

The manner in which the operator of the present invention can feed additional flailing line 76 through the trimmer head 28 from the mower handle 20 of the lawnmower 10 is further illustrated in FIGS. 6, 10, and 13. As previously described, the upper surface of the forward arm tube 60 provides the mounting point for the feed lever bracket 78 which in turn holds the flailing line feed lever 58 itself. It is the flailing line feed lever 58 which allows the operator to easily extend flailing line 76 as needed during operation. This is an important feature to the usefulness of the invention as the normal operation of the trimmer head 28 wears flailing line 76 quite rapidly. This wear necessitates that the invention have the ability to provide for the constant addition of flailing line 76 for the uninterrupted operation of the trimmer head 28 which is accomplished through the use of the flailing line feed lever 58.

The flailing line feed lever 58 is essentially a relatively small and bent arm that is pivotally mounted to the upper surface of the feed lever bracket 78 at a point that is closer the flailing tube feed lever's 58 rear end than its front. The rear end of the flailing tube feed lever 58 is connected to and controlled by the flailing line feed cable 36 which runs back to the mower handle 20 and is held in place on the feed lever bracket 78 by the cable bracket 94. The flailing line feed cable 36 also has a cable ball end 116 located at its tip which fits inside and engages the cable attachment slot 126 located at the most rearward end of the flailing line feed lever 58. The flailing line feed cable 36 can be manipulated by the operator of the present invention to rock the flailing line feed lever 58 up and down which, through means that will be further explained below, dispenses more flailing line 76 at the trimmer head 28.

The front end of the flailing line feed lever 58 is connected to the upper portion of the trimmer head 28 at the feed lever fork 128 which consists of two narrow extensions of the flailing line feed lever 58 separated by a narrow gap. The gap of the feed lever fork 128 is positioned on top of the trimmer head 28 between the feed lever nut 96 and the feed lever washer 98, the combination of which serves to hold the flailing line feed lever 58 in place. When the operator manipulates the feed lever washer 98 through the flailing line feed cable 36 it activates a mechanism, common to trimmer heads, that releases a predetermined amount of flailing line 76 within the trimmer head 28 which allows the operator to continually trim grass without having to stop to add flailing line 76.

Although the present invention has been described in considerable detail with reference to certain preferred versions thereof, other versions are possible. Therefore, the spirit and scope of the appended claims should not be limited to the description of the preferred versions contained herein.

What is claimed is:

1. A walk behind lawnmower having an engine, a mower deck with a front edge, a rear edge, a left and right side edge and a mower handle extending outward from said rear edge and a trimmer assembly attached to the front edge of said mower deck said trimmer assembly comprising:
    an elongate arm having a first and a second end said elongate arm being attached to said mower deck;
    a pivotal connection on said first end of said elongate arm so as to allow said elongate arm to be selectively rotated between a storage position wherein said elongate arm is substantially parallel to the front of said mower deck and an in use position wherein said elongate arm is substantially perpendicular to said front edge of said mower deck;
    a control mechanism for moving said elongate arm between said in use position and said storage position;
    a rotational connection on said second end of said elongate arm;
    a trimmer head attached to said rotational connection such that said trimmer head may be rotated about said elongate arm; and
    a trimmer head rotational control mechanism having a first and second end with said first end attached to said mower handle and a second end attached to said trimmer head.

2. A trimmer assembly as in claim 1 wherein when said elongate arm is in said in use position said trimmer head is substantially aligned with one of said mower decks outer edges.

3. A trimmer assembly as in claim 2 further comprising a drive system connecting said trimmer head to said engine.

4. A trimmer assembly as in claim 3 wherein said drive system comprises a first and second drive belt.

5. A trimmer assembly as in claim 4 wherein said trimmer head dispenses cord for trimming.

6. A trimmer assembly as in claim 5 further comprising a cord dispensing control having a first end attached to said mower handle and a second end attached to said trimmer head.

7. A lawnmower having an engine, a mower deck with a front edge, a rear edge, a left and right side edge and a trimmer assembly attached to said mower deck said trimmer assembly comprising:
    an elongate arm having a first and a second end said elongate arm being attached to said mower deck;
    a pivotal connection on said first end of said elongate arm so as to allow said elongate arm to be selectively rotated in a horizontal plane between a storage position and an in use position;
    a control mechanism for moving said elongate arm between said in use position and said storage position;
    a rotational connection on said second end of said elongate arm;
    a cutting head attached to said rotational connection such that said cutting head may be rotated about said elongate arm;
    a cord dispenser for dispensing cutting cord from said cutting head;
    a cord dispensing control having a first end attached to said mower and second end attached to said cutting head; and
    a cutting head rotational control mechanism.

8. A trimmer assembly as in claim 7 wherein said elongate arm is substantially parallel to the front of said mower deck when placed in said storage position and said elongate arm is substantially perpendicular to said front edge of said mower deck when placed in said in use position.

9. A trimmer assembly as in claim 8 wherein said rotational control mechanism further comprises a first and second end with said second end attached to said cutting head.

10. A trimmer assembly as in claim 9 wherein when said elongate arm is in said in use position said cutting head is substantially aligned with one of said mower decks outer edges.

11. A trimmer assembly as in claim 10 further comprising a drive system connecting said cutting head to said engine.

12. A trimmer assembly as in claim 11 wherein said drive system comprises a first and second trimmer drive belt.

13. A combination mower trimmer comprising:
- a walk behind lawnmower having an engine, a mower deck with a front edge, a rear edge, a left and right side edge and a mower handle extending outward from said rear edge;
- an elongate arm having a first and a second end said elongate arm being attached to said mower deck;
- a pivotal connection on said first end of said elongate arm so as to allow said elongate arm to be selectively rotated between a storage position wherein said elongate arm is substantially parallel to the front of said mower deck and an in use position wherein said elongate arm is substantially perpendicular to said front edge of said mower deck;
- a control mechanism for moving said elongate arm between said in use position and said storage position;
- a rotational connection on said second end of said elongate arm;
- a cutting head means attached to said rotational connection such that said cutting head means may be rotated about said elongate arm; and
- a cutting head means rotational control mechanism said rotational control mechanism having a first and second end with said first end attached to said mower handle and a second end attached to said cutting head.

14. A combination mower trimmer as in claim 13 wherein when said elongate arm is in said in use position said cutting head is substantially aligned with one of said mower decks outer edges.

15. A combination mower trimmer as in claim 14 further comprising a drive system connecting said cutting head to said engine said drive system having a first and second drive belt.

16. A combination mower trimmer as in claim 15 wherein said cutting head dispenses cord for trimming.

17. A trimmer assembly as in claim 16 further comprising a cord dispensing control having a first end attached to said mower handle and a second end attached to said cutting head.

* * * * *